(12) United States Patent
Denney

(10) Patent No.: US 9,682,442 B2
(45) Date of Patent: Jun. 20, 2017

(54) FABRICATION OF WELDED WHEELS WITHOUT FILLER MATERIAL

(71) Applicant: Lincoln Global, Inc., City of Industry, CA (US)

(72) Inventor: Paul Edward Denney, Bay Village, OH (US)

(73) Assignee: Lincoln Global, Inc., City of Industry, CA (US)

( * ) Notice: Subject to any disclaimer, the term of this patent is extended or adjusted under 35 U.S.C. 154(b) by 792 days.

(21) Appl. No.: 13/681,035

(22) Filed: Nov. 19, 2012

(65) Prior Publication Data

US 2013/0088072 A1 Apr. 11, 2013

Related U.S. Application Data

(63) Continuation of application No. 13/269,319, filed on Oct. 7, 2011, now abandoned.

(51) Int. Cl.
*B60B 3/08* (2006.01)
*B23K 26/28* (2014.01)
*B23K 26/20* (2014.01)

(52) U.S. Cl.
CPC ............. *B23K 26/28* (2013.01); *B23K 26/20* (2013.01); *B60B 3/08* (2013.01); *B60B 3/087* (2013.01); *B60B 2310/3026* (2013.01); *B60B 2360/141* (2013.01); *B60B 2900/5116* (2013.01)

(58) Field of Classification Search
CPC .. B60B 3/00; B60B 3/08; B60B 3/087; B60B 25/004; B29D 99/0032; B23K 15/00; B23K 15/0046

USPC .................................... 29/894.321–894.323; 301/63.103–63.106, 64.301–64.303; 228/196
See application file for complete search history.

(56) References Cited

U.S. PATENT DOCUMENTS

| | | | | |
|---|---|---|---|---|
| 1,566,017 A | * | 12/1925 | Jones ....................... | 301/64.304 |
| 2,427,430 A | * | 9/1947 | Waldeck et al. .............. | 384/544 |
| 2,692,801 A | * | 10/1954 | Rosenberg ............... | 301/64.302 |
| 3,020,091 A | * | 2/1962 | Solomon .................. | 301/64.303 |
| 4,088,372 A | * | 5/1978 | Jewett et al. ............ | 301/64.302 |
| 4,286,825 A | * | 9/1981 | Sieving .................... | 301/95.105 |
| 4,376,554 A | * | 3/1983 | Schumacher ............ | 301/64.301 |
| 4,392,603 A | * | 7/1983 | La Force ....................... | 228/196 |
| 5,251,965 A | * | 10/1993 | Johnson .................... | 301/64.303 |
| 5,360,261 A | * | 11/1994 | Archibald et al. ........ | 301/63.107 |

(Continued)

FOREIGN PATENT DOCUMENTS

| | | |
|---|---|---|
| CN | 201941513 U | 8/2011 |
| JP | 06142955 A | 5/1994 |

(Continued)

OTHER PUBLICATIONS

Library of Congress Catalog Card No. 84-71465; ISBN: 0-87170-188-X; San: 204-7586; 1985; American Society for Metals; Other Welding Processes 30-57.

*Primary Examiner* — Jason Bellinger
(74) *Attorney, Agent, or Firm* — Perkins Coie, LLP

(57) ABSTRACT

A hermetically sealed wheel assembly which has been welding autogenously is provided, along with a method and system for welding the wheel assembly. The wheel assembly is made up of at least two components which are laser welded to each other without the use of filler material to create a hermetically sealed wheel assembly.

7 Claims, 4 Drawing Sheets

(56) References Cited

U.S. PATENT DOCUMENTS

| | | | |
|---|---|---|---|
| 5,431,486 A * | 7/1995 | Kamahori | 301/63.104 |
| 5,548,896 A * | 8/1996 | Archibald et al. | 29/894.322 |
| 5,564,792 A * | 10/1996 | Archibald | 301/5.21 |
| 5,613,739 A * | 3/1997 | Sands | 301/95.11 |
| 6,170,918 B1 | 1/2001 | Archibald et al. | |
| 6,312,059 B1 * | 11/2001 | Stach | 301/63.104 |
| 6,428,114 B1 | 8/2002 | Sebode | |
| 6,474,385 B1 | 11/2002 | Bonning et al. | |
| 6,769,743 B1 * | 8/2004 | Aasen et al. | 301/63.104 |
| 7,824,775 B2 * | 11/2010 | Copley et al. | 428/593 |
| 2002/0039517 A1 * | 4/2002 | Coleman et al. | 403/270 |
| 2008/0190901 A1 | 8/2008 | Caprioglio et al. | |
| 2009/0320288 A1 * | 12/2009 | Yelistratov et al. | 29/889.1 |
| 2013/0088071 A1 * | 4/2013 | Denney | 301/64.303 |
| 2013/0088073 A1 * | 4/2013 | Denney | 301/64.303 |
| 2013/0088074 A1 * | 4/2013 | Denney | 301/64.303 |
| 2013/0147256 A1 * | 6/2013 | Denney | 301/64.303 |

FOREIGN PATENT DOCUMENTS

| | | | |
|---|---|---|---|
| JP | 09220901 | A | 8/1997 |
| JP | 11192566 | A | 7/1999 |
| JP | 11240301 | A | 9/1999 |
| JP | 2000203205 | A | 7/2000 |
| JP | 2001199201 | A | 7/2001 |
| WO | WO-9719823 | A1 | 6/1997 |

* cited by examiner

FABRICATION OF WELDED WHEELS WITHOUT FILLER MATERIAL

PRIORITY

The present application is a continuation of U.S. patent application Ser. No. 13/269,319 which is incorporated herein by reference in its entirety.

FIELD OF THE INVENTION

The present invention relates to the art of welding and more particularly to the fabrication of welded wheels without filler materials.

BACKGROUND OF INVENTION

As the art of arc welding has grown, it has found its application in many different structures and uses. It is known that although arc welding can provide a strong bond between metallic components, depending on the process used, it can also result in a weld joint that has porosity. Although in some welding applications an amount of porosity is acceptable, there are other applications where porosity can be problematic. For example, when welding wheel structures that are used for pressurized tires the presence of porosity can result in a welded wheel structure which fails to maintain pressure. To prevent this loss of pressure from occurring it is common to over-weld wheel structures to ensure that the welded wheel structure is capable of maintaining pressure. However, this over-welding increases overall cost of the welded wheel structure by increasing the amount of time needed to weld the wheel and increases the material cost of the wheel, by requiring increases amounts of filler metals used in the welding process. Therefore, it is desirable to provide a welding process which improves the efficiency and quality of welding wheel structures.

SUMMARY OF THE INVENTION

An exemplary embodiment of the present invention is a wheel structure and a method of welding a wheel stricture, where the method of welding the wheel structure includes positioning a first wheel section having a first web portion adjacent to a second wheel section having a second web portion, such that each of the first and second web portions are contacting each other. The method includes directing a laser beam to the first web portion, and autogenously welding the first web portion to the second web portion with a laser beam such that the laser beam passes through an entire thickness of the first web section and the laser beam penetrates at least a portion of a thickness of the second web portion. The autogenously welding creates a hermetically sealed weld joint around a center the welded first and second wheel sections.

BRIEF DESCRIPTION OF DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
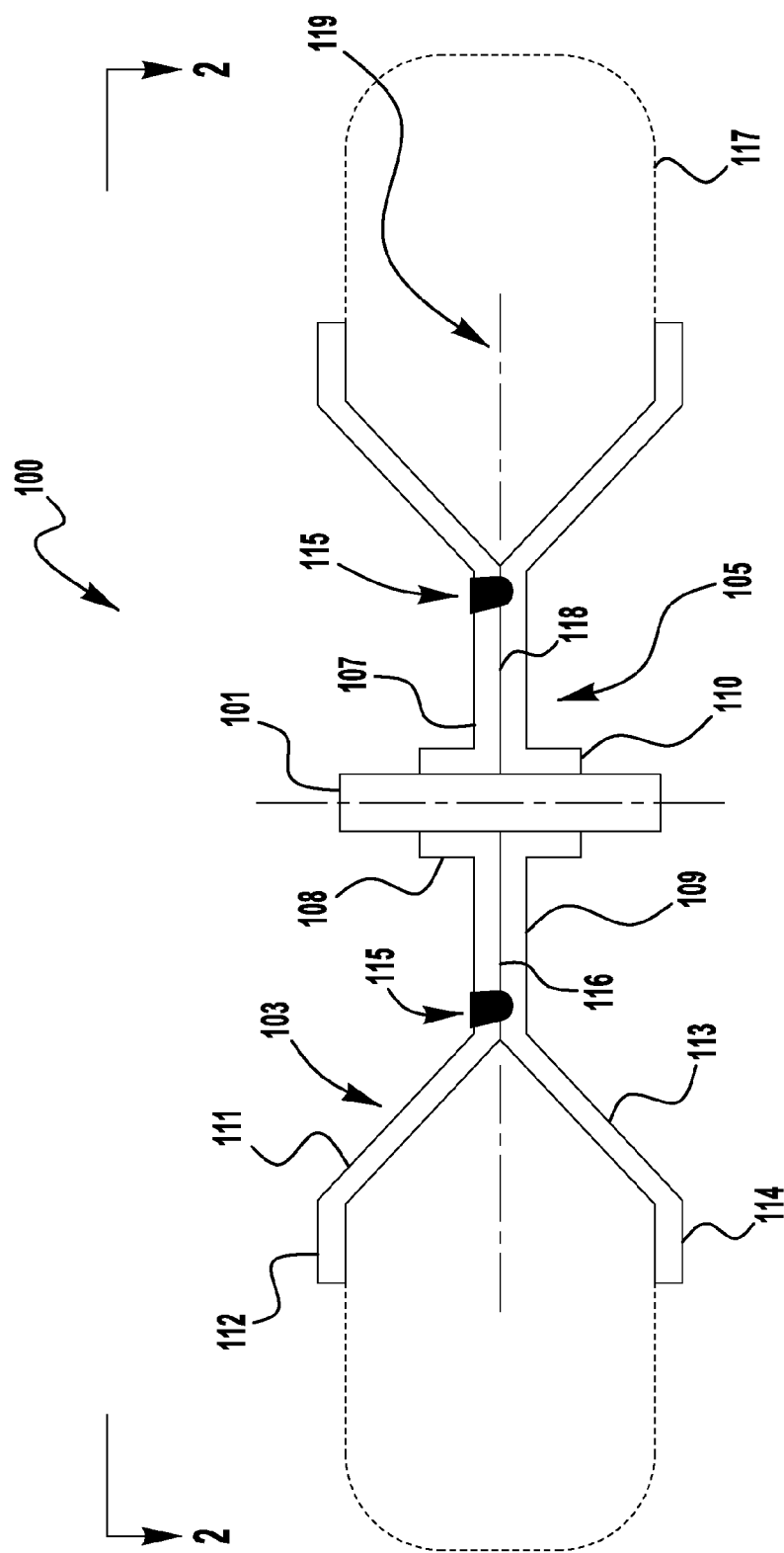
FIG. 1 is a diagrammatical representation of a welded wheel in accordance with an exemplary embodiment of the present invention.

Referring now to the drawings wherein the showings are for the purpose of illustrating exemplary embodiments of the invention only and not for the purpose of limiting the same, an apparatus and system used in practicing the invention is shown in detail in FIGS. 1-4.

Figure 2:
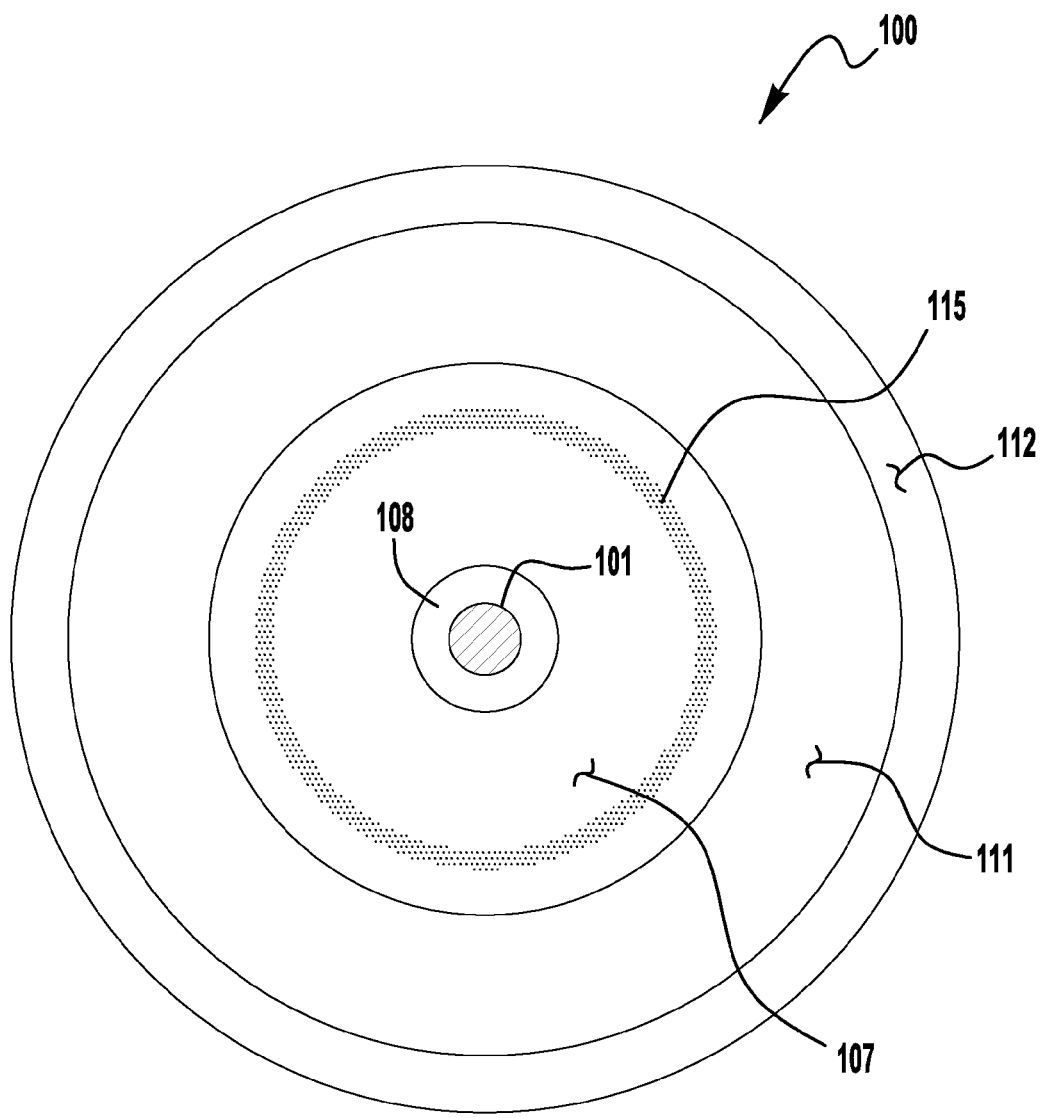
FIG. 2 is a diagrammatical representation of another view of the exemplary wheel of FIG. 1.

FIGS. 1 and 2 depict a wheel assembly 100 in accordance with an exemplary embodiment of the present invention. The wheel assembly 100 contains a hub 101 and two wheel sections 103 and 105 which are to be welded to each other. The hub 101 may or may not be a part of the completed wheel assembly 100 depending on the applications. As shown in FIG. 1, the wheel assembly 100 can have a tire 117 mounted to it. The tire 117 and the sections 103/105 create a void or cavity 119 which can be filled with air or gas under pressure and it is desirable for the sections 103 and 105 to be able to form an air tight and secure assembly for use. The shape and construction of the sections 103 and 105 shown in FIGS. 1 to 4 are intended to be exemplary and other embodiments of the present invention can utilize wheel sections having different shapes as different applications require.

As shown in the Figures, each of the sections 103 and 105 contain a hub portion 108/110 which make contact with the hub 101 or other otherwise adjacent to the centerline of the wheel assembly 100. The hub portions 108/110 can have a flange extension, as shown, which extends along a length of the hub 101 or wheel centerline, or can have other shapes as needed. Extending radially outward from the hub portions 108/110 are web portions 107/109 which are oriented perpendicular to the radial centerline of the assembly 100. In the embodiment shown, the web portions 107/109 are of the same length, but in other embodiments this may not be the case. Also, in the embodiment shown the web portions are shown as solid. However, in other exemplary embodiments it is contemplated that holes can be made web portions 107/109 to reduce the overall weight of the wheel assembly 100. The holes can be of any shape but are usually made as circles, ovals or ellipses so as to avoid creating locations of stress concentrations. The sizing and number of holes should be determined to ensure that the structural integrity of the webs 107/109 are sufficient for their expected loading. The holes should also be positioned radially inward from the weld bead 115—which will be discussed in more detail below.

Extending from the radially outward edges of the web portions 107/109 are angled portions 111/113. The angled portions 111/113 diverge from each other respectively to define at least a portion of the pressure void 119. As shown in FIG. 1 the angled portions are angled between 0 and 90 degrees from the cross-sectional centerline of the assembly 100. The angle to be chosen is based on the design and application of the wheel assembly 100. In some exemplary embodiments the angle can be 90 degrees from the cross-sectional centerline. Extending from the radially outward edge of the angled portions 111/113 are flange portions 112/114. The flange portions 112/114 can be utilized to hold a tire 117 or other similar component as needed. In the embodiment shown the flange portions 112/114 are oriented parallel to the cross-sectional centerline of the assembly 100 as shown. However, in other embodiments this is not required as other angles can be utilized based on the application and design needs. In some exemplary embodiments, the flange portions 112/114 are not needed as the angled portions 111/113 can themselves be utilized to hold any structure or tire 117.

In the embodiments shown the wheel sections 103/105 are shown as an integral component such that the hub, web, angled and flange portions are all made of a single piece of material (usually metal). This can be formed in many different ways including pressing a flat material into the desired shape. However, other exemplary embodiments are not limited to the use of integral sections 103/105 as the sections 103/105 can be made up of welded components.

The two wheel sections 103/105 are secured to each other by welding their respective web portions 107/109, which make contact with each other when the assembly 100 is assembled. As such, each of the web portions 107/109 have surfaces 116/118 which are parallel to each other and made such that the surfaces 116/118 are flush with each other when the portions 103/105 are positioned adjacent to each other for assembly. It is not required that the surfaces 116/118 be flush with each other for the entire length of the web portions 107/108. However, these surfaces 116/118 should be flush with each other at least at the weld joint 115.

In the shown exemplary embodiment, the weld joint 115 is a continuous weld joint 115 which forms a circular pattern around the assembly 100. The weld joint 115 is made by welding through one of the wheel sections 103/105 and into the other of the wheel sections 103/105. In the embodiment shown in FIG. 1, the weld joint is welded through the section 103 and into the section 105. However, as shown the weld joint 115 does not fully penetrate the thickness of the second of the sections (section 105 in FIG. 1). In some embodiments, as discussed further below, the joint 115 can fully penetrate the thickness of both sections 103/105 at the weld.

Unlike prior welded wheel assemblies this weld joint 115 is not made via the use of arc welding or with the use of filler metals. Rather the weld joint 115 is made using a laser welding system in which no filler metal is used—this is commonly referred to as an autogenous weld. Filler metal is typically used to fill gaps during welding and/or to provide additional material to a joint to form a fillet, or the like. However, because the surfaces 116/118 are flush with each other at the weld joint 115 there is no gap to fill and therefore the weld joint 115 is made entirely of the material of the web portions 107/109 and no filler metal is needed.

Furthermore, because the weld joint 115 is made to penetrate through the entire thickness of one section 103 and into at least some of the second section 105, the joint 115 creates a continuous seal around the entire wheel assembly 100. Because of this seal any pressure in the pressure zone 119 (like air pressure) will be unable to pass between the portions 103/105 and escape at the hub 101—which is a problem with arc welded wheels. Thus, this weld joint 115 creates a hermetic weld joint. Therefore, embodiments of the present invention can create a welded wheel assembly 100 having a weld made with no filler material which provides the needed structural integrity and the needed air tight seal for pressurized wheel applications. With embodiments of the present invention, a significant amount of filler material and welding is avoided, as it is often needed to weld the sections 103/105 to the hub 101—with filler metal—to provide the required air tight seal.

As shown in FIG. 2, the weld joint 115 has a circular pattern along a radius from the center of the assembly 100. However, embodiments of the present invention are not limited in this regard. For example, it is contemplated that the weld joint 115 can have a zig-zag or undulating pattern along a radius from the center of the assembly 100. Such a pattern would increase the overall length of the weld joint 115 to provide added structural integrity. However, the weld joint 115 should be continuous so as to provide the requisite hermetic seal between the sections 103/105, if the wheel is to be used in a pressurized application. It is noted that to the extent holes are placed in the webs 107/109 to reduce the weight of the assembly (as discussed above) the weld joint 115 should be placed radially outward from the holes to provide the needed air tight seal—in pressurized applications. Of course, many different types of patterns can be used for the welding operation.

It is further noted that although a single weld joint 115 is shown in the figures, the present invention is not limited in this regard. Specifically, additional weld joints can be used to increase the strength of the wheel assembly 100. For example, another weld joint can be positioned radially inward or outward from the weld joint 115. Further, any additional joint does not have to be continuous but can be an intermittent or spot weld joint. As long as one weld joint (115) is continuous, any additional weld joint will not have to be continuous to provide the requisite air tight seal. Of course, it can be continuous as well—if needed.

Figure 3:
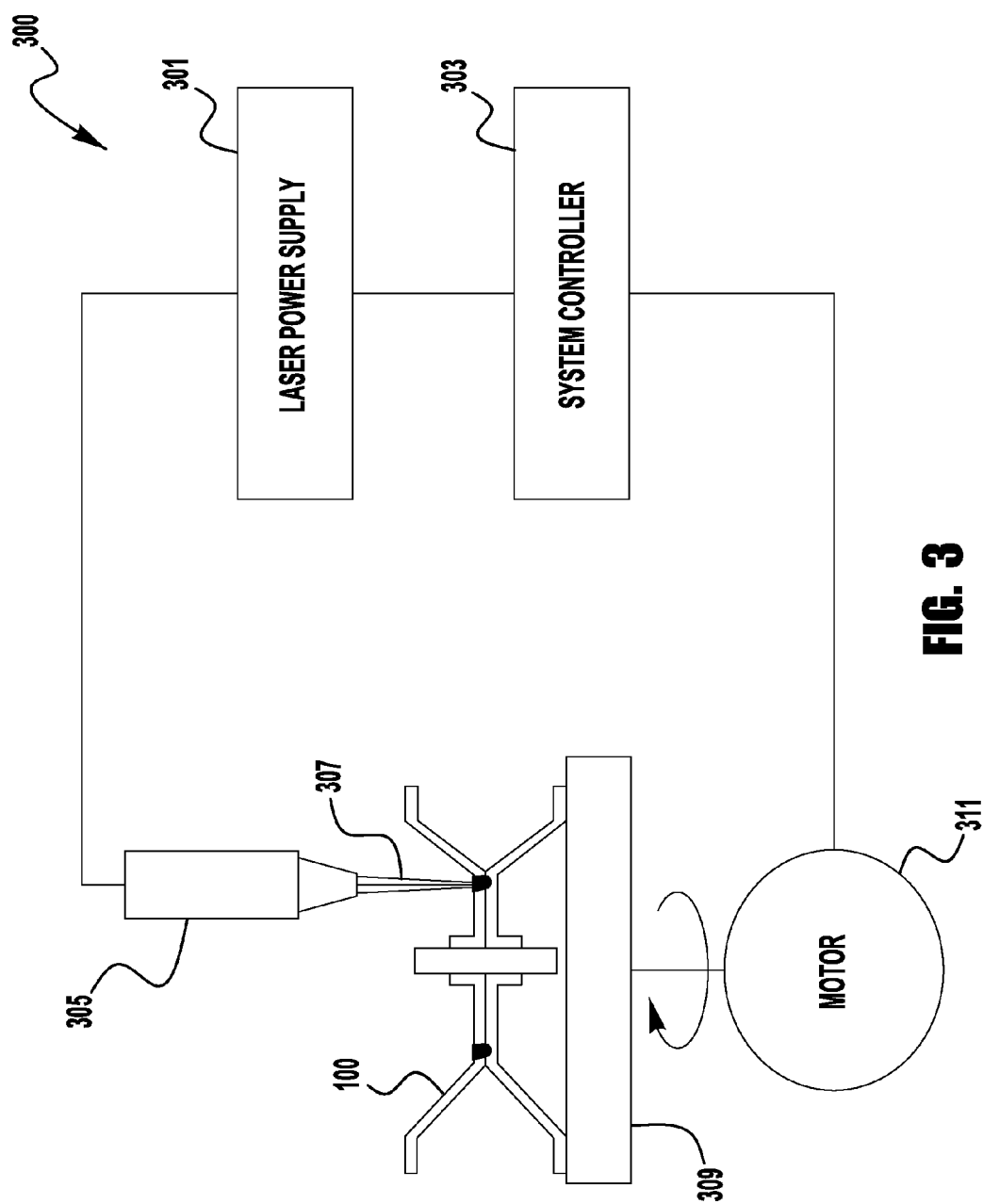
FIG. 3 is a diagrammatical representation of an exemplary embodiment of a welding system of the present invention.

FIG. 3 depicts an exemplary welding system 300 for welding the assembly 100 described above. As discussed above, the weld joint 115 is created using a laser welding system with no filler metal. The system 300 includes a laser power supply 301 which supplies power to a laser 305. The laser 305 can be any known type of laser which is capable of laser welding, including but not limited to carbon dioxide, Nd:YAG, Yb-disk, YB-fiber, fiber delivered or direct diode laser systems. Further, white light or quartz laser type systems can be used if they have sufficient energy. Other embodiments of the system may employ electron beam energy. Exemplary lasers should have power capabilities in the range of 1 to 20 kW. Higher power lasers can be utilized, but can become very costly. In the embodiment shown, the laser 305 is emitting a single beam 307 to weld the joint 115. However, a multiple beam configuration can also be employed if desired. A multiple beam configuration can use multiple lasers 305 and/or beam splitters with a single laser 305 as desired. In such an embodiment the separate beams can be used to make separate portions of the same continuous weld, or can be positioned adjacent to each other to make a wider weld joint.

The laser 305 emits a beam 307 having a sufficient energy and shape to fully penetrate or keyhole the entire thickness of the web portion 107/109 of one of the wheel sections 103/105 and at least some of the thickness of the web portion 107/109 of the other of the wheel sections 103/105. This will be discussed further below.

The system 300 also includes a system controller 303 which monitors and/or controls the power supply 301 and/or the laser 307 to produce a sufficient weld. Additionally, in the embodiment shown the controller 303 also controls a motor 311 which is coupled to a platen 309 which rotates during welding. In the embodiment shown, the platen 309 is rotated while the laser 305 and beam 307 remain stationary to complete the weld. Of course, in other exemplary embodiments the laser 305 can be moved to create the joint 115. In further embodiments, both the wheel 100 and the laser 305 can be moved to create the weld, or the laser 305 can remain stationary while the beam 307 is moved using optics of the laser 305. Embodiments of the present invention are not limited in this regard, as other means of creating the weld can be used. For example, other configurations can use mirrors or optics external to the laser optics which move and translate to create the desired weld pattern.

It is noted that although the controller 303, power supply 301, laser 305, motor 311 and platen 309 are shown as separate components in FIG. 3, this is done for clarity. It is contemplated that at least some or all of these components can be made into an integral unit or assembly to perform the welding operation. It is not required that these components are separate physical structures.

Figure 4:
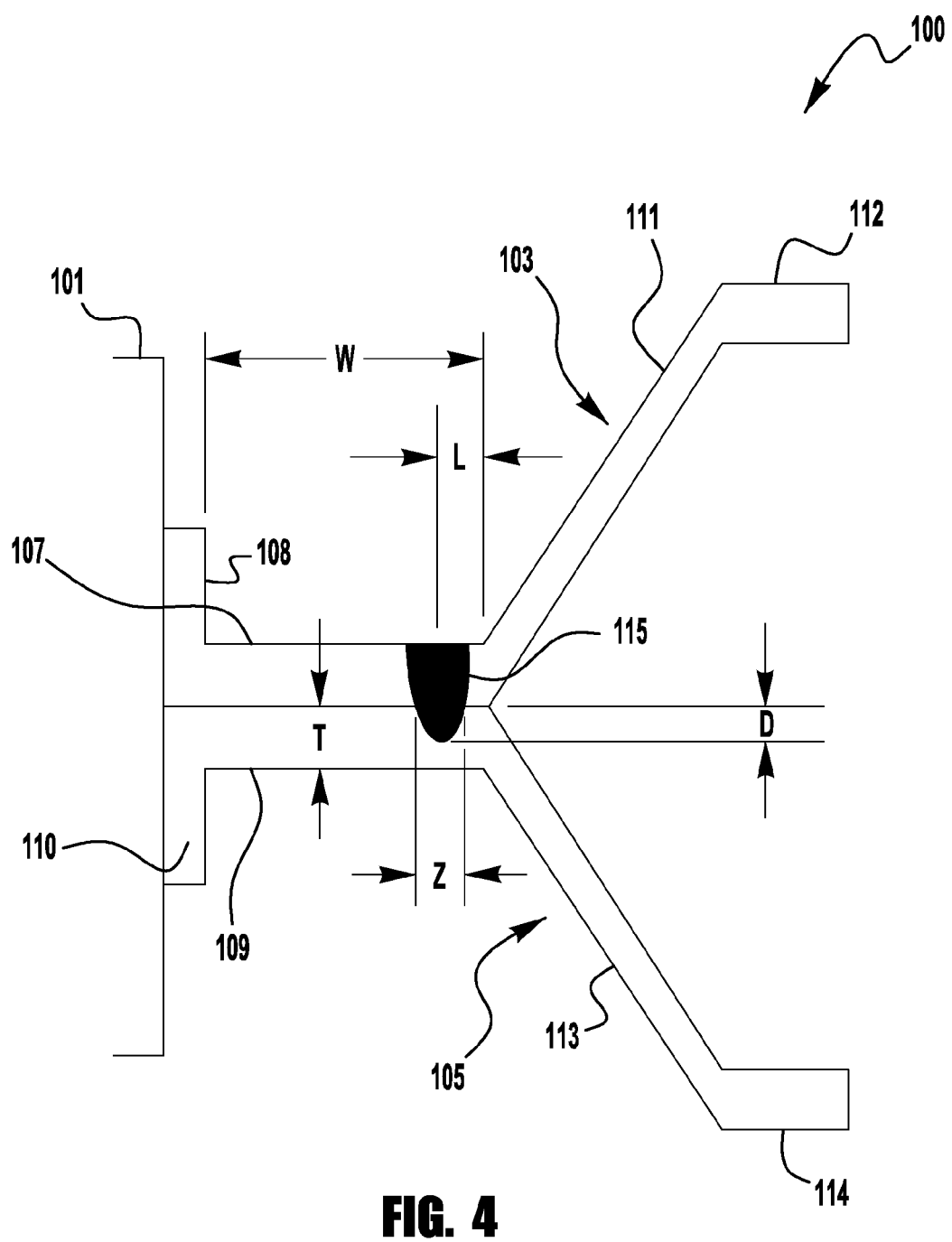
FIG. 4 is a diagrammatical representation of another view of the exemplary wheel of FIG. 1.

Turning now to FIG. 4, a more detailed view of the joint 115 is shown. As shown, the web 107 has a length W and the center of the weld joint 115 is positioned a distance L from the outer radial edge of the web 107. In most embodiments this distance should be relatively small so that the joint 115 is close to the angled portions 111/113. This will aid in minimizing the moment forces on the webs 107/109 when the assembly 100 is in use. In exemplary embodiments of the present invention, the distance L should be based on the thickness of the web material and the design loads on the wheel in the area of the weld 115. If the web is of sufficient thickness and stiffness the distance L can approach 0% of the length W. However, in other embodiments the distance L is in the range of 10 to 80% of the web length W.

Furthermore, the web 109 has a thickness T and the weld joint 115 penetrates the web 109 by a distance D. In exemplary embodiments the distance D is less than the thickness T. In some exemplary embodiments, the distance D is in the range of 5 to 100% of the thickness T, as long as the distance L results in a structurally sound weld. In other embodiments the distance is in the range of 20 to 75%. Of course, other depths can be employed as needed. In fact, in some exemplary embodiments the joint 115 will keyhole through both web portions 107/109. These welds will penetrate 100% of the thickness T and provide a "witness mark" on the back of the web to allow for inspection of the weld joint—to ensure sufficient penetration. However, to the extent that both web portions 107/109 are fully keyholed the back bead of the joint 115 should be controlled carefully so that no significant amount of weld metal sags below the bottom web portion 109 as this could create a cavity in the upper surface of the weld joint (as no filler metal is employed).

In some exemplary embodiments the depth of the weld joint 115 in the lower portion 109 can vary along the length of the weld. For example, it may not be structurally necessary for the weld joint to have a constant depth in the lower web portion 109. Therefore, in some exemplary embodiments portions of the weld joint 115 can be at a first depth and other portions of the joint 115 can have a second depth, which is shallower than the first depth. For example, the first depth D can be go up to 100% of the thickness T of the web 109 and the second depth can be in the range of 5 to 50% of the thickness T, where the second depth is less than the first depth. Any change or depth differential can be made as long as at least one weld results in a hermetic seal and the weld joint(s) meet the desired mechanical strengths. The length of the different depth sections can vary as well depending on the strength requirements of the weld joint 115. For example, the first depth can be welded for 2 inches while the shallower depth can then be welded for 5 inches and then return to the first depth for 2 inches, etc. This allows for the optimization of the weld joint 115 in the wheel. This oscillating depth can be created by changing the energy density of the beam 307 during the welding operation. Such an embodiment can speed the welding operation and conserve welding energy. This variation in weld depth can also be achieved by changing the shape of the beam 307, the energy density of the beam, and/or the speed of the welding process.

The cross-sectional width of the weld joint 115 at the meeting of the surfaces 116/118 should be sufficient to provide the needed structural integrity for the weld. Embodiments of the present invention are not limited by the overall cross-sectional shape of the weld joint, except that the point 115 should have the required structural integrity. To increase the width of the joint 115 (if needed) a multi-beam laser welding process can be used. In exemplary embodiments, the weld joint 115 at the meeting of the web portions 107/109 has a width Z. The width Z should be sufficient to hermetically seal the wheel 100 as well as provide whatever strength is needed. In some exemplary embodiments of the present invention the width Z is in the range of 10 to 100% of the thickness T. In some exemplary embodiments, the weld joint 115 may not be needed to provide strength to the wheel. As such, a thinner weld joint 115 can be employed which is used to primarily hermetically seal the wheel. For example, in such embodiments the weld joint can have a width Z in the range of 5 to 50% of T. In some exemplary embodiments, the width Z is not constant for the entire weld. For example, it may not be necessary to have the entire length of the weld joint 115 at a constant thickness because of strength requirements. In such embodiments, some portions of the joint 115 can have a first thickness Z, while other portions have a second thickness Z which is less then the first section. In such embodiments the first sections can provide the bulk of the strength of the joint 115 while the thinner sections provide less strength but continue the hermetic seal. Such embodiments allow for the conservation of energy during the welding process. In some exemplary embodiments, multiple beams can be used to vary the width of the weld joint 115 during welding.

Embodiments of the present invention allow for the creation of hermetically sealed wheel assemblies 100 which have been welded autogenously in less than half of the time as prior art wheels, with significantly less cost and less product scrapping due to porosity from arc welding.

Of course, it should be noted that the sections 103/105 can have other weld joints than those described herein as needed or desired. For example, in some other exemplary embodiments the hub portions 108/110 can be welded to the hub 101 for added strength. Alternatively the hub portions 108/110 can be autogenously welded to the hub in lieu of welding through the web portions 107/109. Depending on the construction of the wheel 100 the autogenous weld joint can be placed anywhere as needed so that the desired strength and hermetic seal is achieved. Further, the sections 103/105 can be welded to each other at the contact point between the sections (the seam where they contact each other) inside the void 119. These welds can be laser welds as described herein. Of course, there can be multiple welds on the wheel assembly 100 as desired, where at least one weld is autogenous. Depending on the fit of the sections 103/105, it may be necessary in some parts of the wheel to use a weld with filler material to fill in gaps. This can be done with any known welding method which uses filler material.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welded wheel structure, comprising:
a first wheel section having a first web portion;
a second wheel section having a second web portion, where each of said first and second web portions are contacting each other and each of said first and second web portions have the same length; and
a continuous hermetically sealed weld joint which welds said first web portion to said second web portion, such that said weld joint passes through an entire thickness of said first web portion and penetrates 5 to 100% of said thickness of said second web portion;
wherein said weld joint is positioned radially around a center of said welded first and second sections,
wherein said weld joint is an autogenous weld joint, and
wherein said first web portion has a web length between a hub portion positioned radially inward from said first web portion and an angled portion positioned radially outward from said first web portion, and said weld joint is positioned on the first web portion 10 to 80% of the web length inward from said angled portion.

2. The welded wheel structure of claim 1, wherein said weld joint penetrates 20 to 75% of said thickness of said second web portion.

3. The welded wheel structure of claim 1, wherein said weld joint is welded in a pattern having a nonconstant radial distance from said center.

4. The welded wheel structure of claim 1, wherein said weld joint has a width in the range of 10 to 100% of the thickness of said second web portion at the point at which said first and second web portions contact each other.

5. The welded wheel structure of claim 1, wherein a width of said weld joint at the point at which said first and second web portions contact each other varies between a first width and a second width, where said first width is in the range of 10 to 100% of the thickness of said second web portion and said second width is in the range of 5 to 50% of the thickness of said second web portion, and wherein said second width is less than said first width.

6. The welded wheel structure of claim 1, wherein at least one of said first and second web portions has cavities through an entire thickness of said first or second web portion and said weld joint is positioned radially outward from said cavities.

7. A welded wheel structure, comprising:
a first wheel section having a first web portion;
a second wheel section having a second web portion, where each of said first and second web portions are contacting each other; and
a continuous hermetically sealed weld joint which welds said first web portion to said second web portion, such that said weld joint passes through an entire thickness of said first web portion and penetrates 5 to 100% of said thickness of said second web portion;
wherein said weld joint is positioned radially around a center of said welded first and second sections,
wherein said weld joint is an autogenous weld joint, and
wherein said first web portion has a web length between a hub portion positioned radially inward from said first web portion and an angled portion positioned radially outward from said first web portion, and said weld joint is positioned on the first web portion 10 to 80% of the web length inward from said angled portion.

* * * * *